United States Patent [19]
Senatro

[11] 3,913,949
[45] Oct. 21, 1975

[54] SHROUDED FLAMMABLE FLUID CARRYING TUBE

[75] Inventor: Clement A. Senatro, Newington, Conn.

[73] Assignee: United Technologies Corporation, Hartford, Conn.

[22] Filed: Nov. 8, 1974

[21] Appl. No.: 522,377

[52] U.S. Cl. .................. 285/14; 285/55; 285/175; 285/332; 285/354; 285/357
[51] Int. Cl.² ........................................ F16L 19/02
[58] Field of Search.......... 285/175, 357, 133 R, 14, 285/55, 89, 149, 354, 332

[56] References Cited
UNITED STATES PATENTS

| 1,349,663 | 8/1920 | Cumfer | 285/133 R |
| 2,390,103 | 12/1945 | Johnson | 285/89 |
| 3,180,659 | 4/1965 | Vigneron | 285/175 X |
| 3,584,900 | 6/1971 | Lennon | 285/14 |

FOREIGN PATENTS OR APPLICATIONS

| 603,121 | 3/1960 | Italy | 285/149 |
| 2,026,707 | 12/1971 | Germany | 285/354 |

*Primary Examiner*—Thomas F. Callaghan
*Attorney, Agent, or Firm*—Charles A. Warren

[57] ABSTRACT

A shrouded tube construction including concentric tubes is attached to a cooperating coupling in such a manner as to prevent leakage from either tube, and to lock the attachment of the inner tube without overstressing either attachment or either tube.

12 Claims, 2 Drawing Figures

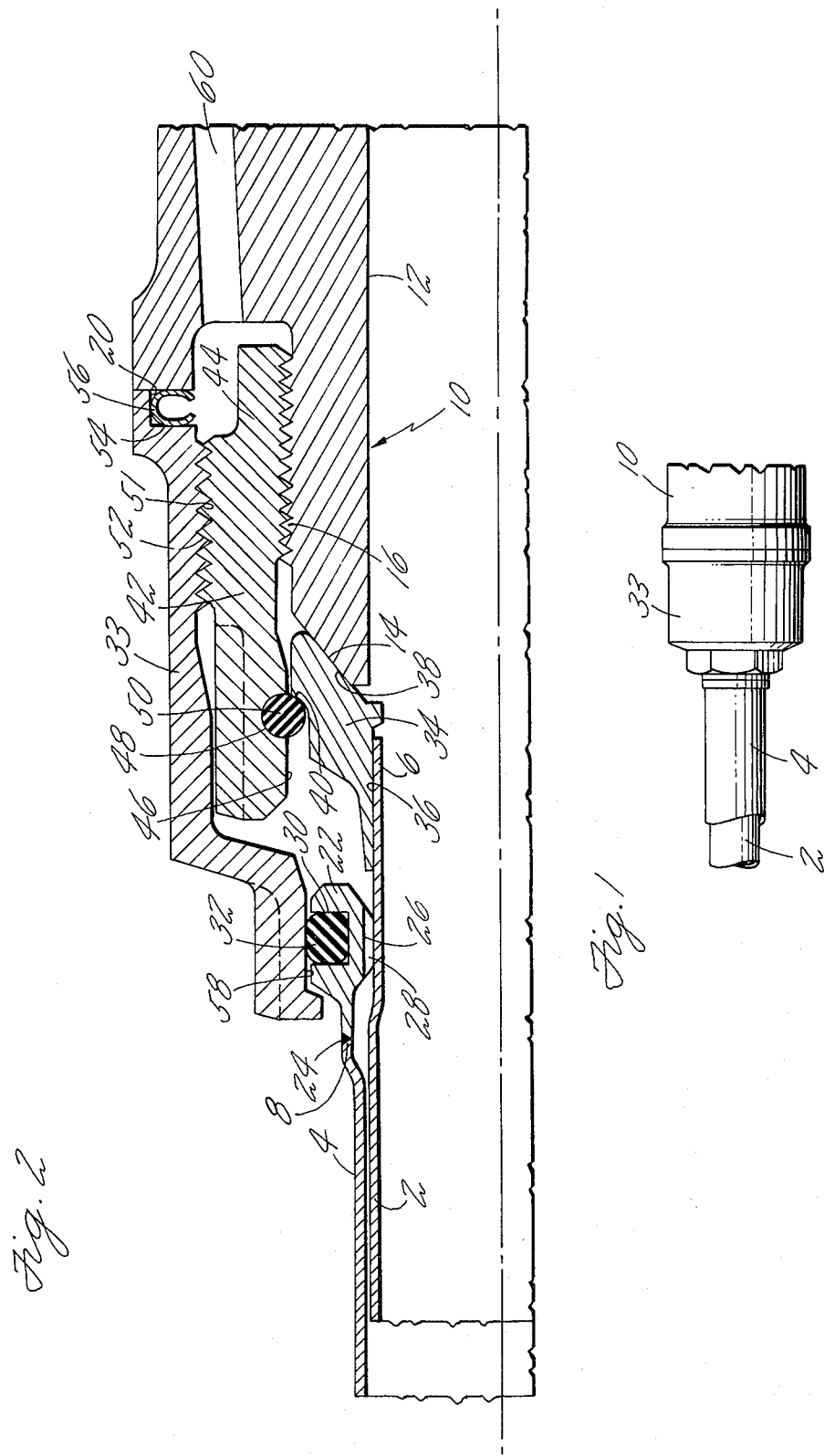

SHROUDED FLAMMABLE FLUID CARRYING TUBE

SUMMARY OF THE INVENTION

The present invention relates to the attachment of concentric tubes to a coupling and is particularly concerned with such an attachment which will avoid any leakage from either tube attachment and will also prevent excessive stress loading on either attachment. The arrangement also provides for locking the inner tube attachment by the outer tube attachment, avoiding any independent locking of the inner attachment.

According to the invention, the inner tube has an attached end element that is held against the coupling in sealing arrangement by an inner coupling nut and the outer tube is held in position by an outer coupling nut so arranged that no axial load is placed on the outer end element on the outer tube. Desirably the outer end element is arranged to surround and engage the inner tube to hold the tubes in concentric relation.

The foregoing and other objects, features, and advantages of the present invention will become more apparent in the light of the following detailed description of preferred embodiments thereof as illustrated in the accompanying drawing.

BRIEF DESCRIPTION OF THE DRAWING

FIG. 1 is an elevation of the device.

FIG. 2 is a sectional view through the concentric tubes and the associated coupling.

DESCRIPTION OF THE PREFERRED EMBODIMENT

Referring to the drawing, the inner tube 2 is positioned within the outer tube 4 and the end 6 of the inner tube extends beyond the end 8 of the outer tube. The coupling 10 to which the tubes are attached has a central passage 12 that is in alignment with the inner tube 2 and an end sealing surface 14, which in the arrangement shown is conical.

Externally of the sealing surface 14, the coupling has an externally threaded surface 16, concentric to and axially spaced from the sealing surface 14. Adjacent to and concentric to the threaded surface 16 is a shoulder 20 on the coupling 10, this shoulder being on a larger diameter than the surface 16 and in axially spaced relation thereto.

An outer end member 22 is attached as by a weld 24 to the outer tube 4. This member has an inner surface 26 concentric to the inner wall of tube 4 and this surface has inward projections 28 that engage with the inner tube and hold the tubes in concentric relation. This member 22 has a groove 30 in its outer surface and this groove receives an O-ring 32. Adjacent the weld 24 the tube 4 may be expanded, as shown, before attachment of the member 22. Before attachment of the member 22 the outer coupling nut 33 is positioned over the tubes to the left of the member 22.

After attachment of end member 22, an inner end member 34 is attached to the end of the inner tube 2. This member has an inner surface 36 corresponding in dimension to the outer diameter of tube 2 and the member 34 is fitted over the end of tube 2 and secured thereto as by brazing. This member 34 has a conical end sealing surface 38 having the same taper as the sealing surface 14 on coupling 10 and engaging therewith as shown when the tubes are attached to the coupling. This inner end member 34 has a shoulder 40 formed on its outer surface as shown.

An inner coupling nut 42 is positioned in surrounding relation to the end member 34. This nut has an inner threaded surface 44 to engage with the threads 16. This nut also has an inner cylindrical surface 46 slightly larger than the outer diameter of inner end member 34 and in this surface is a groove 48 to receive a thrust ring 50. This ring is in a position to engage the shoulder 40 so that, as the nut is screwed onto the coupling, the thrust ring pushes the member 34 against the sealing surface 14 to prevent leakage at this point. This inner coupling nut 42 has a threaded external surface 51 concentric to the inner threaded surface 44 and substantially surrounding the inner surface.

The outer coupling nut 33 is then slid substantially into the position shown. This nut has an inner threaded surface 52 engaging with the threaded surface 51. Adjacent these threads 52 the nut 33 has a notch 54 to receive a sealing ring which is urged against shoulder 20. Leakage from the space between the tubes is prevented by the seal 56 at this point.

This coupling nut 33 has a cylindrical surface 58 surrounding the outer end member 34 which engages with and is axially slidable over the O-ring 32 so that no axial load is applied to the outer tube. Fluid in the space between the tubes may escape between the inner and outer coupling nuts, past the threads between the inner and outer nuts and through a passage 60 in the coupling. This passage, which communicates with the outer surface of the coupling between the inner and outer threaded surfaces may be connected to a drain or to a suitable leak indicator.

With the two sets of threads of different pitch, the inner coupling nut will not be loosened or torqued too highly by the tightening of the outer nut and no specific locking device need be used on the inner threads to keep them securely tight in use. The inner threads are preferably a finer pitch than the outer threads. Lock-wiring of the outer coupling nut will assure locking of the inner nut also. In this arrangement the inner and outer tubes are free of positive attachment to one another and thus loading of the outer weld and possible failure is avoided.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by Letters Patent of the United States is:

1. An attachment for a shrouded tube, the latter including an inner pressure carrying tube and an outer containment tube, the attachment including a coupling having a central opening therein with a seating surface at one end thereof, a concentric threaded surface surrounding the seating surface, an inner end member on the inner tube having a seating surface cooperating with the seating surface on the coupling, an outer end member on the outer tube, said outer end member surrounding the inner tube and in spaced relation to the end member thereon, an inner coupling nut engaging said inner end member and said inner threaded surface and holding the sealing surfaces in contact, said inner coupling nut having a threaded outer surface, and an outer coupling nut engaging said outer end member and said outer threaded surface and holding said outer end member in position.

2. An attachment as in claim 1 in which the outer end member has inward projections thereon engaging the inner tube to hold the latter concentric to the outer tube.

3. An attachment as in claim 1 in which the threads on the two surfaces differ in pitch.

4. An attachment as in claim 1 in which the outer end member has a groove in its outer surface and an O-ring in said groove, and the outer coupling nut has a cylindrical surface in sliding engagement with said O-ring.

5. An attachment as in claim 1 in which the inner nut has an internal groove therein and a thrust ring in said groove, said ring engaging a shoulder on the inner end member.

6. An attachment as in claim 1 in which the coupling has a passage therein radially outward of the threaded surface thereon for venting fluids between the tubes.

7. An attachment for a shrouded tube, the latter including spaced inner and outer tubes, the former being a pressure fluid tube and the latter being a containment tube, the attachment including a coupling to which the tubes are attached, the coupling having a threaded surface, and a central passage concentric thereto, an outer end element secured to the outer tube in surrounding relation to the inner tube, an inner end element secured to the inner tube in axially spaced relation to the outer end element, an inner coupling nut engaging with the threaded surface on the coupling and having means thereon for urging said inner end element into endwise engagement with the coupling, said nut having an outer threaded surface thereon, and an outer coupling device engaging with said outer threaded surface, said device having associated therewith an inner cylindrical surface surrounding the outer end element, the latter having a groove therein to receive a sealing ring for engagement with said cylindrical surface.

8. An attachment as in claim 7 in which the two threaded surfaces have different pitched threads.

9. An attachment as in claim 7 in which the inner coupling nut and said inner end element have cooperating means by which the nut urges the member against the end of the coupling.

10. An attachment as in claim 7 in which the outer end element has projections on its inner surface to engage the inner tube and hold the two tubes in concentric spaced relation.

11. An attachment as in claim 7 in which the outer coupling device is free of axial engagement with the outer end element to minimize axial loading on the outer tube.

12. An attachment as in claim 7 in which the coupling has a shoulder adjacent to the outer threaded surface, and the outer coupling device has a cooperating groove between which is positioned a sealing ring.

* * * * *